(12) United States Patent
Shei et al.

(10) Patent No.: US 10,704,781 B2
(45) Date of Patent: Jul. 7, 2020

(54) WATERPROOF LIGHT EMITTING MODULE AND DISPLAY DEVICE

(71) Applicant: E Ink Holdings Inc., Hsinchu (TW)

(72) Inventors: Tsai-Wei Shei, Hsinchu (TW); Mei-Chen Chang, Hsinchu (TW); Yu-Nan Pao, Hsinchu (TW); Hsin-Tao Huang, Hsinchu (TW); Ming-Chuan Hung, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 193 days.

(21) Appl. No.: 15/951,189

(22) Filed: Apr. 12, 2018

(65) Prior Publication Data
US 2019/0056099 A1 Feb. 21, 2019

(30) Foreign Application Priority Data

Aug. 15, 2017 (CN) .......................... 2017 1 0698555

(51) Int. Cl.
*F21V 31/00* (2006.01)
*F21V 15/015* (2006.01)
(Continued)

(52) U.S. Cl.
CPC .......... *F21V 31/005* (2013.01); *F21V 15/015* (2013.01); *F21V 19/0035* (2013.01); *F21V 21/0808* (2013.01); *G02B 6/0093* (2013.01); *G09F 9/33* (2013.01); *F21Y 2115/10* (2016.08); *G02B 6/0068* (2013.01);
(Continued)

(58) Field of Classification Search
CPC .............................. F21V 31/005; F21V 31/00
See application file for complete search history.

(56) References Cited

U.S. PATENT DOCUMENTS 6,867,827 B2 3/2005 Cha et al.
7,033,063 B2 4/2006 Cha et al.
(Continued)

FOREIGN PATENT DOCUMENTS

CN 101017710 A 8/2007
CN 102122463 A 7/2011
(Continued)

OTHER PUBLICATIONS

Corresponding Taiwan office action dated Jan. 22, 2018.
(Continued)

*Primary Examiner* — Evan P Dzierzynski
(74) *Attorney, Agent, or Firm* — CKC & Partners Co., LLC

(57) ABSTRACT

A waterproof light emitting module is provided. The waterproof light emitting module comprises a circuit board, a light emitting diode, a light guide plate, and a waterproof layer. The light emitting diode is over the circuit board, and having a light emitting surface, a first non-light emitting surface and a second non-light emitting surface. The light guide plate is adjacent to the light emitting surface of the light emitting diode. The waterproof layer covers the first non-light emitting surface and the second non-light emitting surface of the light emitting diode. The waterproof layer includes an adhesive, a substrate, a recessed portion of the light guide plate, a portion of the circuit board or a combination thereof. A display device including the waterproof light emitting module is also provided herein.

9 Claims, 9 Drawing Sheets

(51) Int. Cl.
*F21V 21/08* (2006.01)
*F21V 19/00* (2006.01)
*F21V 8/00* (2006.01)
*G09F 9/33* (2006.01)
*F21Y 115/10* (2016.01)
*G02F 1/13357* (2006.01)
*G02F 1/1333* (2006.01)

(52) U.S. Cl.
CPC ...... *G02B 6/0086* (2013.01); *G02F 1/133615* (2013.01); *G02F 2001/133311* (2013.01); *G02F 2201/50* (2013.01); *G02F 2202/28* (2013.01)

(56) References Cited

U.S. PATENT DOCUMENTS

| | | | |
|---|---|---|---|
| 8,547,011 B2 | 10/2013 | Yamada et al. | |
| 2013/0010495 A1* | 1/2013 | Moon | G02B 6/003 362/609 |
| 2014/0369067 A1* | 12/2014 | Chen | G02B 6/0021 362/606 |
| 2015/0155614 A1 | 6/2015 | Youn et al. | |
| 2016/0131822 A1* | 5/2016 | Tai | G02B 6/0076 362/612 |

FOREIGN PATENT DOCUMENTS

| | | |
|---|---|---|
| CN | 102313159 B | 7/2013 |
| CN | 106097907 A | 11/2016 |
| KR | 101089791 B1 | 12/2011 |
| TW | 201415130 A | 4/2014 |
| TW | 201500815 A | 1/2015 |
| TW | 1631297 B | 8/2018 |

OTHER PUBLICATIONS

Corresponding Taiwan office action dated Apr. 9, 2020.
Notice of Allowance of U.S. Appl. No. 161572,641 dated Mar. 6, 2020.

* cited by examiner

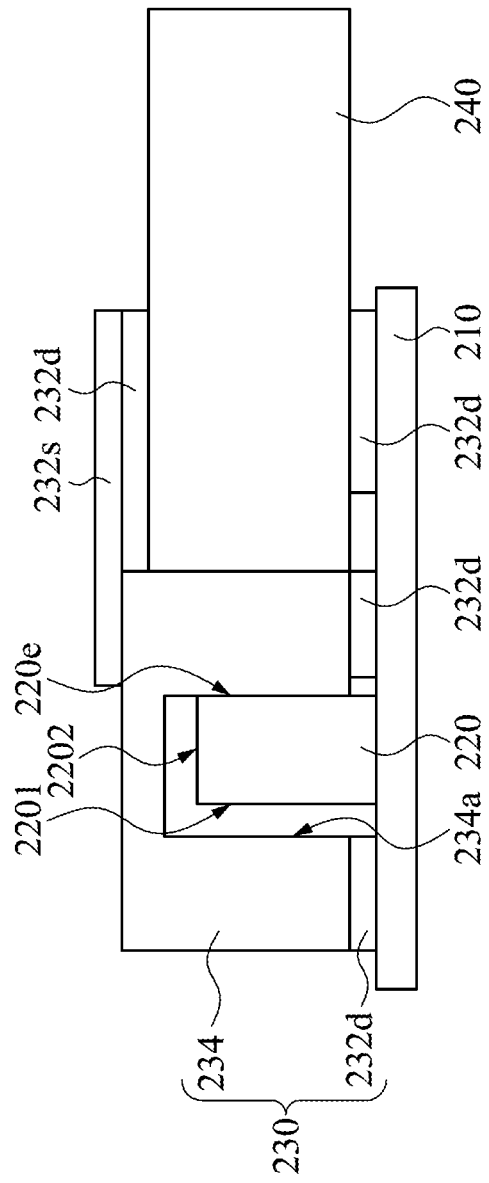
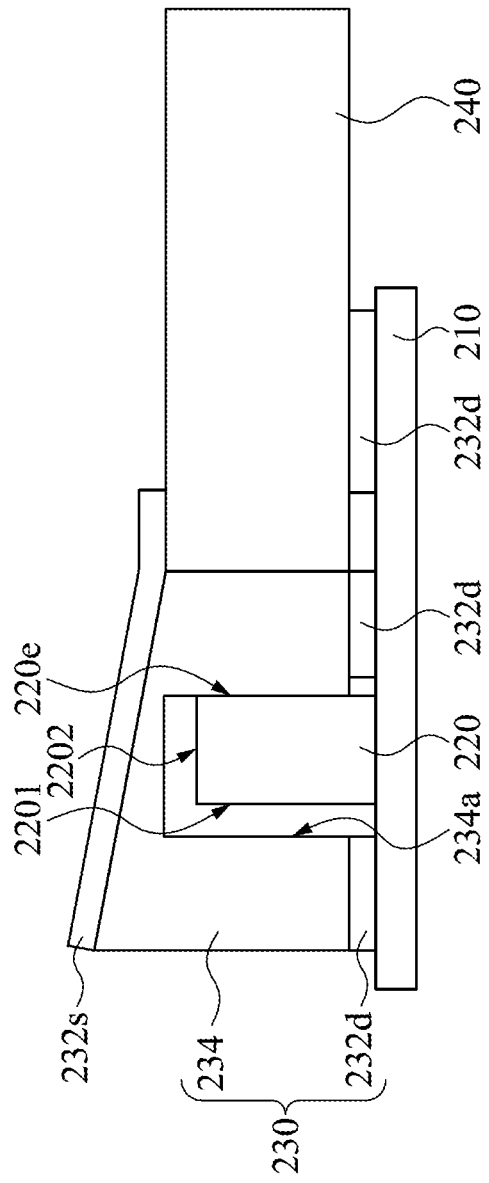

WATERPROOF LIGHT EMITTING MODULE AND DISPLAY DEVICE

CROSS-REFERENCE TO RELATED APPLICATION

This application claims priority to Chinese Application Serial Number 201710698555.1, filed Aug. 15, 2017, which is herein incorporated by reference.

BACKGROUND

Field of Invention

The present disclosure relates to a waterproof light emitting module and a waterproof display device.

Description of Related Art

Most of existing light-emitting modules do not have waterproof structures, and thus are vulnerable to moisture, causing circuit short or corrosion. Therefore, how to improve the light-emitting module and the display device with the light-emitting module to have excellent waterproof property is an issue in the art.

SUMMARY

A purpose of the present disclosure is to provide a light emitting diode device, a light emitting module and a display device with excellent waterproof property. It is possible to prevent a light emitting diode from damage due to moisture by disposing a waterproof layer covering the light emitting diode.

The present disclosure provides a waterproof light emitting diode device, which includes: a circuit board; a light emitting diode over the circuit board, and the light emitting diode having a contact; and a waterproof layer covering the contact of the light emitting diode, in which the waterproof layer includes an adhesive, a single-sided adhesive tape, a double-sided adhesive tape, a plastic substrate or a combination thereof.

According to some embodiments of the present disclosure, the light emitting diode has a light emitting surface, and the waterproof layer is not in contact with the light emitting surface.

The present disclosure provides a waterproof light emitting module, which includes: a circuit board; a light emitting diode over the circuit board, the light emitting diode having a light emitting surface, a first non-light emitting surface and a second non-light emitting surface; a light guide plate adjacent to the light emitting surface of the light emitting diode; and a waterproof layer covering the first non-light emitting surface and the second non-light emitting surface of the light emitting diode, the waterproof layer including an adhesive, a substrate, a recessed portion of the light guide plate, a portion of the circuit board or a combination thereof.

According to some embodiments of the present disclosure, the waterproof layer includes the adhesive and the substrate, and the adhesive is in contact with the circuit board and covers the first non-light emitting surface of the light emitting diode, and the substrate is in contact with the adhesive and covers the second non-light emitting surface of the light emitting diode.

According to some embodiments of the present disclosure, the waterproof layer further includes a double-sided adhesive tape, and the substrate is fixed on the light guide plate through the double-sided adhesive tape.

According to some embodiments of the present disclosure, the waterproof layer includes a single-sided adhesive tape, a double-sided adhesive tape and the substrate, and the substrate is fixed on the circuit board through the double-sided adhesive tape, and the substrate covers the first non-light emitting surface of the light emitting diode, and the single-sided adhesive tape is in contact with the substrate and covers the second non-light emitting surface of the light emitting diode.

According to some embodiments of the present disclosure, the substrate further covers the light emitting surface of the light emitting diode.

According to some embodiments of the present disclosure, the waterproof layer includes a double-sided adhesive tape and the substrate, and the substrate has a recessed portion covering the first non-light emitting surface and the second non-light emitting surface of the light emitting diode and further covering the light emitting surface, and the substrate is fixed on the circuit board through the double-sided adhesive tape.

According to some embodiments of the present disclosure, the waterproof layer includes a double-sided adhesive tape and the recessed portion of the light guide plate, and the recessed portion of the light guide plate covers the first non-light emitting surface and the second non-light emitting surface of the light emitting diode and further covers the light emitting surface, and the light guide plate is fixed on the circuit board through the double-sided adhesive tape.

According to some embodiments of the present disclosure, the waterproof layer includes a double-sided adhesive tape and the portion of the circuit board, and the portion of the circuit board covers the first non-light emitting surface and the second non-light emitting surface of the light emitting diode, and the portion of the circuit board is fixed on the light guide plate through the double-sided adhesive tape.

According to some embodiments of the present disclosure, the waterproof layer includes a double-sided adhesive tape and the substrate, and the substrate covers the first non-light emitting surface and the second non-light emitting surface of the light emitting diode and further covers the circuit board, and the substrate is fixed on the light guide plate through the double-sided adhesive tape.

The present disclosure provides a waterproof display device, which includes: the above-mentioned waterproof light emitting module; a display panel fixed on a first surface of the light guide plate; and a protective layer fixed on a second surface of the light guide plate, and the second surface being opposite to the first surface.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIGS. 5-14 are cross-sectional views of waterproof light emitting modules according to some embodiments of the present disclosure.

DETAILED DESCRIPTION

Figure 1:
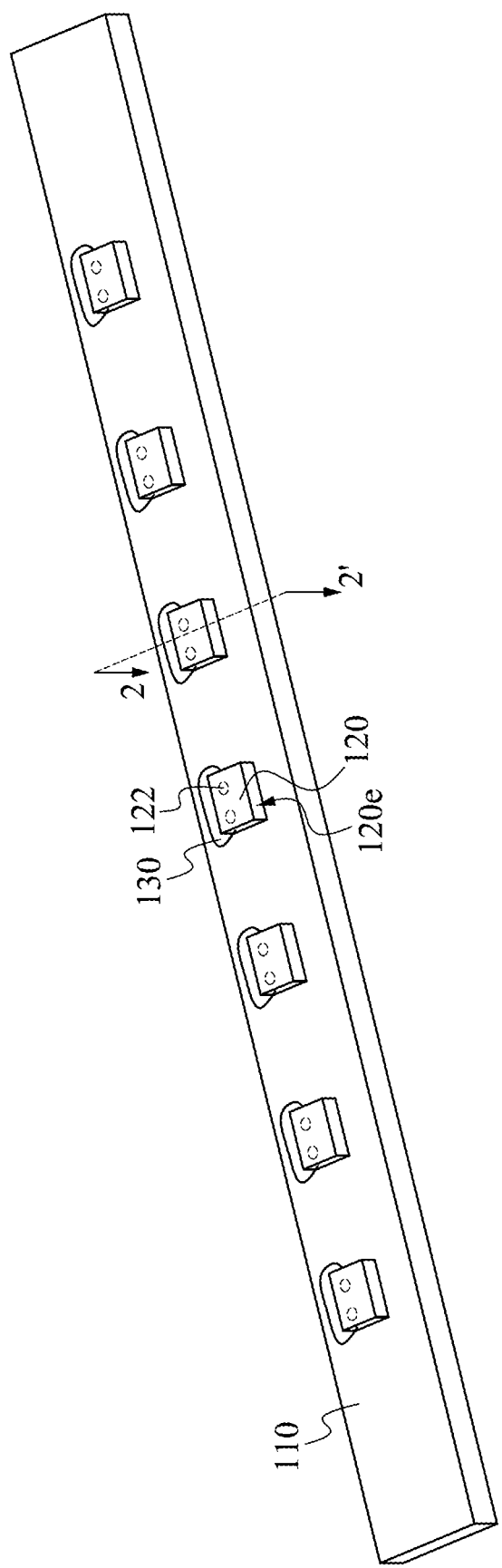
FIG. 1 is a top view of a waterproof light emitting diode device according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "over" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure provides a waterproof light emitting diode device. It is possible to prevent a contact of a light emitting diode from damage due to moisture by disposing a waterproof layer covering the contact of the light emitting diode. Various embodiments of the waterproof light emitting diode device will be described below in detail.

FIG. 1 is a top view of a waterproof light emitting diode device according to some embodiments of the present disclosure. The waterproof light emitting diode device includes a circuit board 110, a light emitting diode 120 and a waterproof layer 130. The waterproof light emitting diode device can also be called as a waterproof light bar. It is noted that FIG. 1 shows the waterproof layer 130 covering contacts of a single light emitting diode, but those skilled in the art can understand that the waterproof layer can be extended to cover contacts of multiple light emitting diodes.

In some embodiments, the circuit board is a flexible printed circuit (FPC), a printed circuit board (PCB) or a combination thereof.

The light emitting diode 120 is on the circuit board 110. The light emitting diode 120 may be top-emitting or side-emitting. In some embodiments, the light emitting diode is side-emitting and has a light emitting surface 120e, as shown in FIG. 1. The light emitting diode 120 has at least one contact 122. The contact 122 may also be called as a soldering point. In some embodiments, the contact 122 of the light emitting diode 120 is disposed between a bottom surface of the light emitting diode 120 and the circuit board 110.

The contact 122 includes a metal material, which is vulnerable to damage from moisture. Therefore, the present disclosure provides the waterproof layer 130 covering the contact 122 of the light emitting diode 120 to prevent the contact 122 from damage due to moisture. In some embodiments, the waterproof layer 130 includes an adhesive, a single-sided adhesive tape, a double-sided adhesive tape, a plastic substrate or a combination thereof. In some embodiments, the plastic substrate includes polyimide (PI), polyethylene terephthalate (PET), Teflon, liquid crystal polymer (LCP), polyethylene (PE), polypropylene (PP), polystyrene (PS), polyvinyl chloride (PVC), Nylon or polyamides, polymethylmethacrylate (PMMA), acrylonitrile-butadiene-styrene (ABS), phenolic resins, epoxy, polyester, silicone, polyurethane (PU), polyamide-imide (PAI) or a combination thereof, but not limited thereto.

Figure 2:
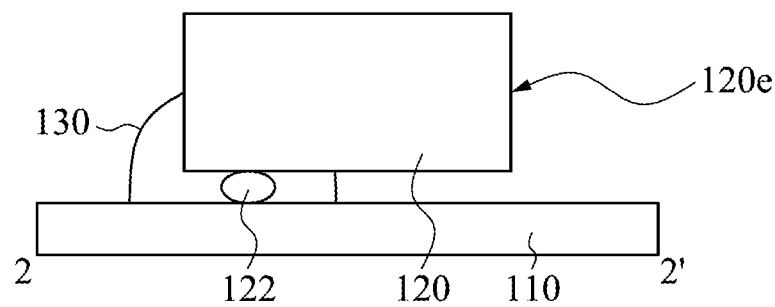
FIG. 2 is a cross-sectional view of the waterproof light emitting diode device taken along a section line 2-2' of FIG. 1 according to some embodiments of the present disclosure.

FIG. 2 is a cross-sectional view of the waterproof light emitting diode device taken along a section line 2-2' of FIG. 1 according to some embodiments of the present disclosure. As shown in FIG. 2, the waterproof layer 130 surrounds and is in contact with the contact 122 of the light emitting diode 120 to prevent the contact 122 from damage due to moisture. In some embodiments, the waterproof layer 130 includes an adhesive covering the entire contact 122 but not covering the entire light emitting diode 120. In some embodiments, the waterproof layer 130 is not in contact with the light emitting surface 120e of the light emitting diode 120, and thus does not affect light emitting characteristics of the light emitting diode 120.

Figure 3:
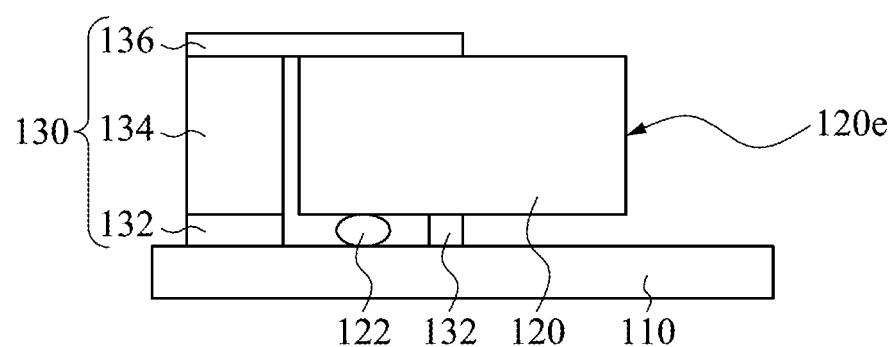
FIG. 3 is a cross-sectional view of a waterproof light emitting diode device according to some embodiments of the present disclosure.

FIG. 3 is a cross-sectional view of a waterproof light emitting diode device according to some embodiments of the present disclosure. As shown in FIG. 3, the waterproof layer 130 surrounds but is not in contact with the contact of the light emitting diode 120. The waterproof layer 130 includes a first waterproof layer 132, a second waterproof layer 134 and a third waterproof layer 136, which constitute a confined space. Specifically, the first waterproof layer 132 is adhered to the circuit board 110 and surrounds the contact 132. The second waterproof layer 134 is disposed over the first waterproof layer 132. In top view (not shown), the second waterproof layer 134 surrounds a portion of the light emitting diode 120. The third waterproof layer 136 is adhered to the second waterproof layer 134 and a top surface of the light emitting diode 120.

In some embodiments, the first waterproof layer 132 is a double-sided adhesive tape, an adhesive or a combination thereof. In some embodiments, the second waterproof layer 134 is a plastic substrate. In some embodiments, an upper surface and a bottom surface of the plastic layer are non-sticky. In other embodiments, the plastic substrate may be replaced with other waterproof substrates, such as a metal substrate or an alloy substrate. In some embodiments, the third waterproof layer 136 is a single-sided adhesive tape.

Figure 4:
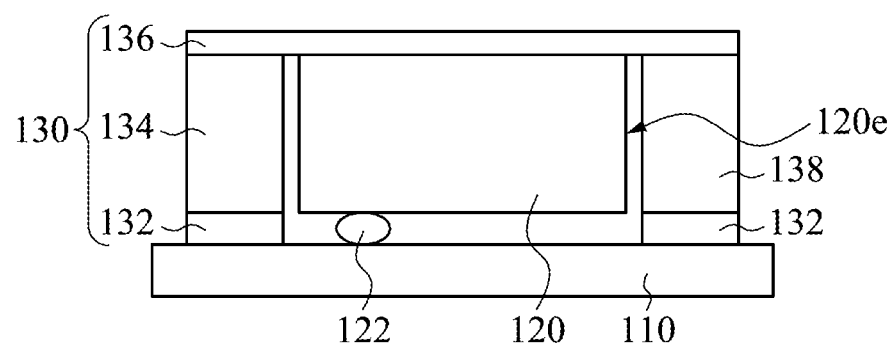
FIG. 4 is a cross-sectional view of a waterproof light emitting diode device according to some embodiments of the present disclosure.

FIG. 4 is a cross-sectional view of a waterproof light emitting diode device according to some embodiments of the present disclosure. As shown in FIG. 4, the waterproof layer 130 surrounds the entire light emitting diode 120. The waterproof layer 130 includes a first waterproof layer 132, a second waterproof layer 134, a third waterproof layer 136 and a fourth waterproof layer 138, which constitute a confined space. Specifically, the first waterproof layer 132 is adhered to the circuit board 110 and surrounds the entire light emitting diode 120. The second waterproof layer 134 and the fourth waterproof layer 138 are disposed over the first waterproof layer 132. In top view (not shown), the second waterproof layer 134 and the fourth waterproof layer 138 constitute an annular shape, which surrounds the entire light emitting diode 120. The third waterproof layer 136 is adhered to the second waterproof layer 134, the fourth waterproof layer 138 and a top surface of the light emitting diode 120. In other embodiments (not shown), the third waterproof layer is adhered to the second waterproof layer and the fourth waterproof layer but not adhered to a top surface of the light emitting diode.

In some embodiments, the first waterproof layer 132 is a double-sided adhesive tape, an adhesive or a combination thereof, and the adhesive may be waterproof adhesive. In some embodiments, the second waterproof layer 134 is a plastic substrate. The second waterproof layer 134 may be transparent or opaque. In some embodiments, the fourth waterproof layer 138 is a transparent plastic substrate. In some embodiments, the fourth waterproof layer 138 is polymethylmethacrylate. The fourth waterproof layer 138 may be in contact with or not in contact with the light emitting surface 120e. In some embodiments, the third waterproof layer 136 is a single-sided adhesive tape. In other embodiments (not shown), the second waterproof layer, the third waterproof layer and the fourth waterproof layer are made of a same material, which constitute an integrally formed waterproof case. The waterproof case may be in contact with or not in contact with a top surface of the light emitting diode.

As shown in FIGS. 1 to 4, the waterproof layer 130 covers the contact 122 or the entire light-emitting diode 120, so that ambient moisture fail to be in contact with the contact 122 to prevent it from damage due to moisture.

The present disclosure further provides a waterproof light emitting module. The light emitting module may be applied to a backlight module or a front light module. Specifically, the light emitting module includes a light guide plate. The light guide plate may be disposed over a back surface or a display surface of the display panel. Various embodiments of the waterproof light emitting module will be described below in detail.

FIGS. 5 to 14 are cross-sectional views of waterproof light emitting modules according to some embodiments of the present disclosure. The waterproof light emitting module includes a circuit board 210, a light emitting diode 220, a light guide plate 240 and a waterproof layer 230. The waterproof layer 230 is selected from the group consisting of an adhesive, a single-sided adhesive tape, a double-sided adhesive tape, a substrate, a recessed portion of the light guide plate, a portion of the circuit board and a combination thereof. The substrate may be a plastic substrate, a metal substrate, an alloy substrate, other suitable waterproof substrate or a combination thereof. In some embodiments (not shown), the waterproof light emitting module includes a plurality of light emitting diodes, and the circuit board and the light emitting diodes constitute a light bar. For the sake of clarity, each of FIGS. 5 to 14 shows a single light emitting diode 220.

Figure 5:
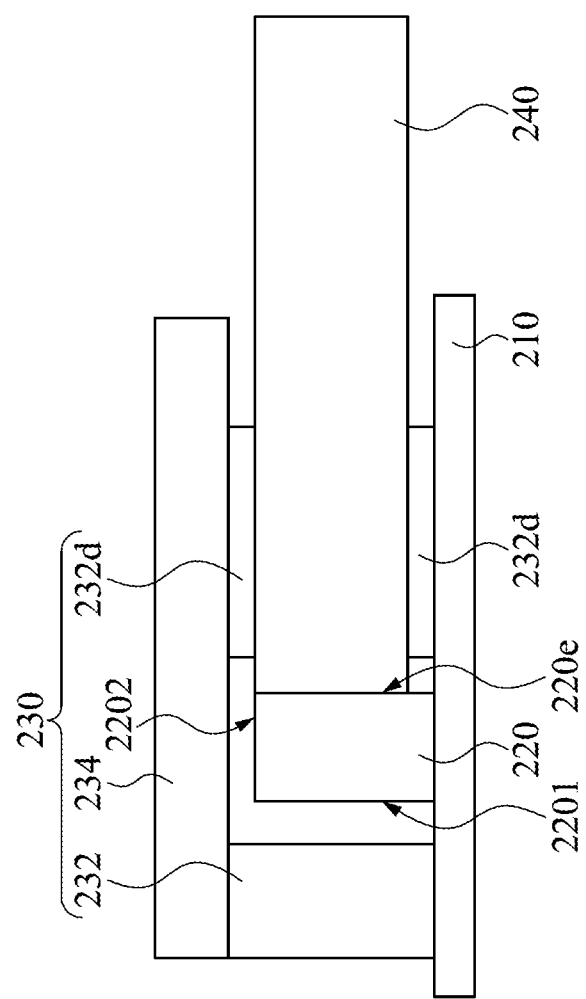

Referring to FIG. 5, the waterproof light emitting module includes a circuit board 210, a light emitting diode 220, a light guide plate 240 and a waterproof layer 230.

The light emitting diode 220 is disposed over the circuit board 210. In some embodiments, the light emitting diode 220 is side-emitting. The light emitting diode 220 has a light emitting surface 220e, a first non-light emitting surface 2201 and a second non-light emitting surface 2202. The light emitting surface 220e is opposite to the first non-light emitting surface 2201, and the second non-light emitting surface 2202 is connected between the light emitting surface 220e and the first non-light emitting surface 2201. As shown in FIG. 5, the second non-light emitting surface 2202 may also be acted as a top surface.

The light guide plate 240 is adjacent to the light emitting surface 220e of the light emitting diode 220. In some embodiments, the light guide plate 240 is fixed on the circuit board 210. In some embodiments, the light guide plate 240 is fixed on the circuit board 210 through a double-sided adhesive tape 232d.

It is noted that the waterproof layer 230 of FIG. 5 includes an adhesive 232 and a substrate 234. The adhesive 232 is in contact with the circuit board 210 and covers the first non-light emitting surface 2201 of the light emitting diode 220. The substrate 234 is in contact with the adhesive 232 and covers the second non-light emitting surface 2202 of the light emitting diode 220. In some embodiments, the waterproof layer 230 further includes a double-sided adhesive tape 232d, and the substrate 234 is fixed on the light guide plate 240 through the double-sided adhesive tape 232d. In other embodiments, the adhesive 232 may be replaced with the double-sided adhesive tape.

Figure 6:
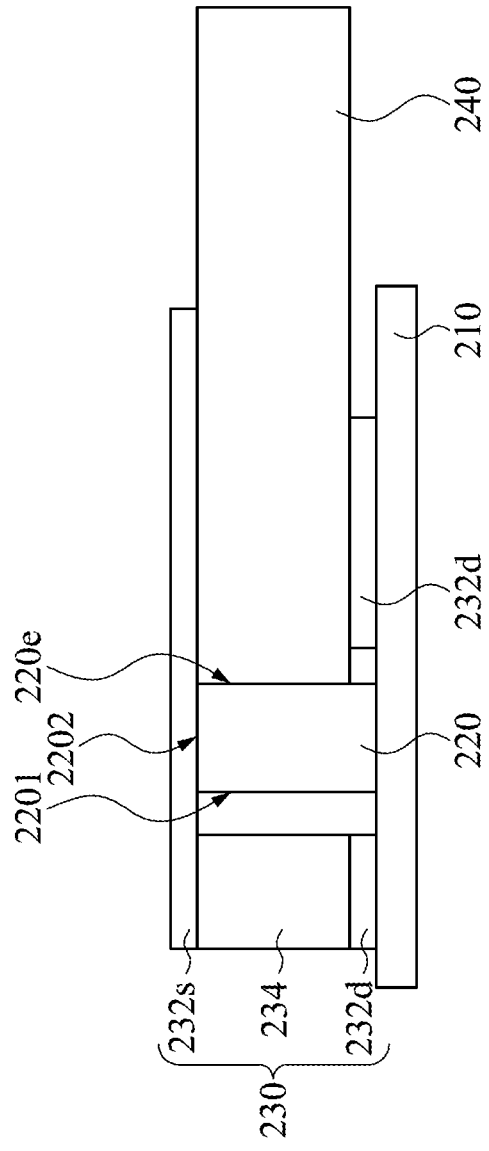

Next, as shown in FIG. 6, the waterproof layer 230 includes a single-sided adhesive tape 232s, a double-sided adhesive tape 232d and a substrate 234. The substrate 234 is fixed on the circuit board 210 through the double-sided adhesive tape 232d. The substrate 234 covers the first non-light emitting surface 2201 of the light emitting diode 220, and the single-sided adhesive tape 232s is in contact with the substrate 234 and covers the second non-light emitting surface 2202 of the light emitting diode 220. In some embodiments, the single-sided adhesive tape 232s further covers a surface of the light guide plate 240 (not marked).

Figure 7:
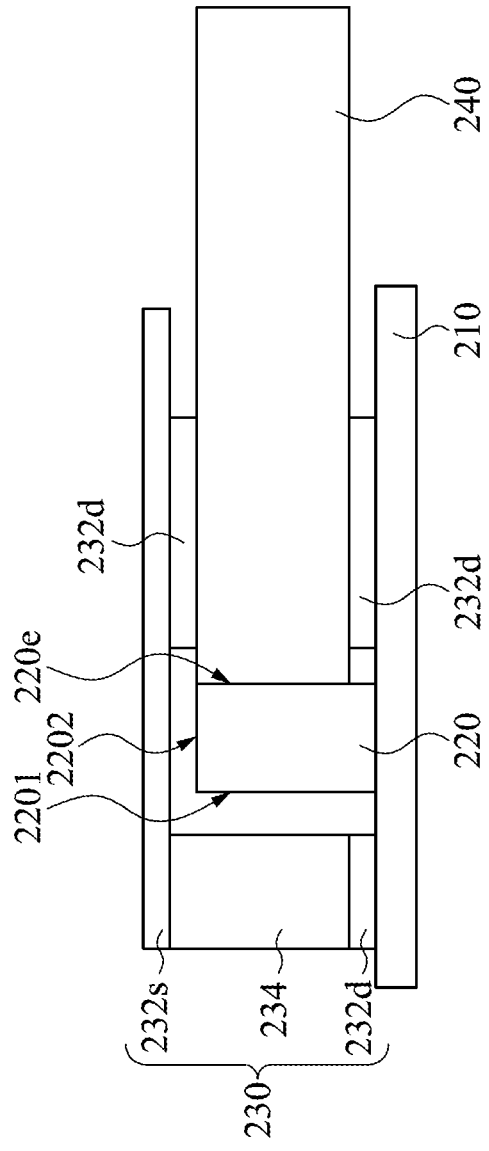

FIG. 7 is similar to FIG. 6, and the difference therebetween is that the waterproof layer 230 of FIG. 7 further includes another double-sided adhesive tape 232d disposed between the single-sided adhesive tape 232s and the light guide plate 240. In other embodiments, the other double-sided adhesive tape 232d may be replaced with a single-sided adhesive tape or an adhesive.

Figure 8:
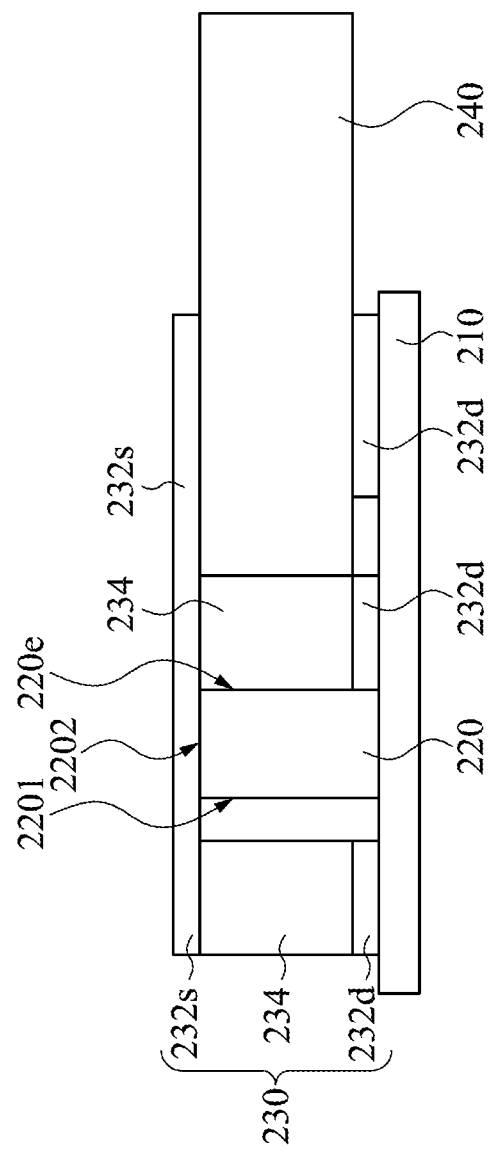

FIG. 8 is similar to FIG. 6, and the difference therebetween is that the substrate 234 of FIG. 8 further covers the light emitting surface 220e of the light emitting diode 220. In other words, the substrate 234 is disposed between the light emitting surface 220e of the light emitting diode 220 and the light guide plate 240.

Referring to FIG. 9, the waterproof layer 230 includes a double-sided adhesive tape 232d and a substrate 234. The substrate is fixed on the circuit board 210 through the double-sided adhesive tape 232d. The substrate 234 has a recessed portion 234a. The recessed portion 234a covers not only the first non-light emitting surface 2201 and the second non-light emitting surface 2202 of the light emitting diode 220 but also the light emitting surface 220e of the light emitting diode 220. In some embodiments, the recessed portion 234a is in contact with the light emitting surface 220e of the light emitting diode 220. In some embodiments, the waterproof layer 230 further includes a single-sided adhesive tape 232s in contact with the substrate 234 and covering a surface (not marked) of the light guide plate 240. In some embodiments, another double-sided adhesive tape 232d is disposed between the single-sided adhesive tape 232s and the light guide plate 240. In other embodiments (not shown), the other double-sided adhesive tape 232d may be replaced with a single-sided adhesive tape or an adhesive.

FIG. 10 is similar to FIG. 9, and the difference therebetween is that a top surface (not marked) of the substrate 234 of FIG. 10 is inclined. Specifically, the top surface of the substrate 234 extends obliquely upward from a side near the light guide plate 240 to a side away from the light guide plate 240. In some embodiments, the single-sided adhesive tape 232s is directly in contact with a surface (not marked) of the light guide plate 240.

Figure 11:
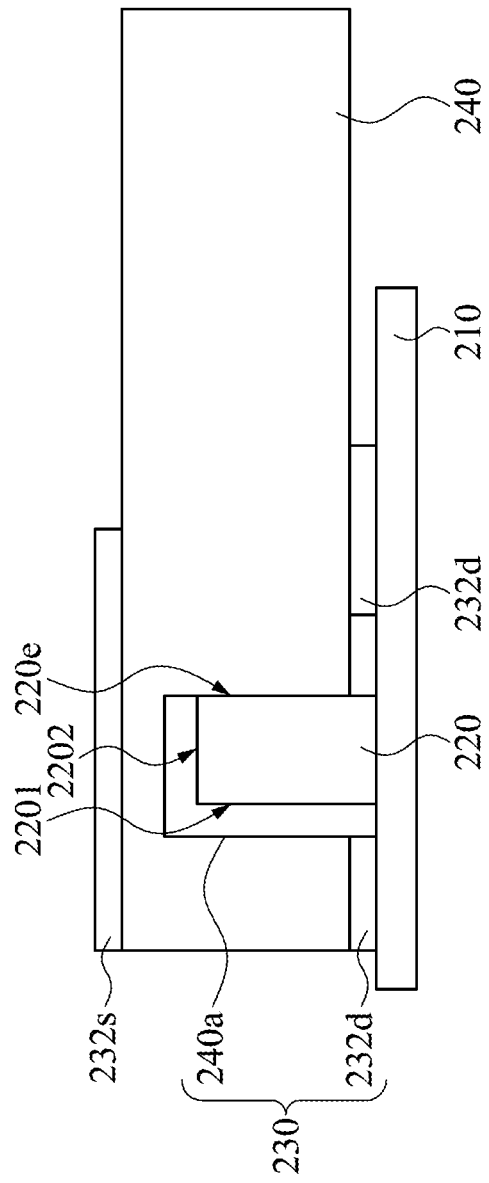

Referring to FIG. 11, the waterproof layer 230 includes a double-sided adhesive tape 232d and a recessed portion 240a of a light guide plate 240. The light guide plate 240 is fixed on a circuit board 210 through the double-sided adhesive tape 232d. The recessed portion 240a of the light guide plate 240 covers not only the first non-light emitting surface 2201 and the second non-light emitting surface 2202 of the light emitting diode 220 but also the light emitting surface 220e of the light emitting diode 220. In some embodiments, the waterproof layer 230 further includes a single-sided adhesive tape 232s covering a surface (not marked) of the light guide plate 240.

Figure 12:
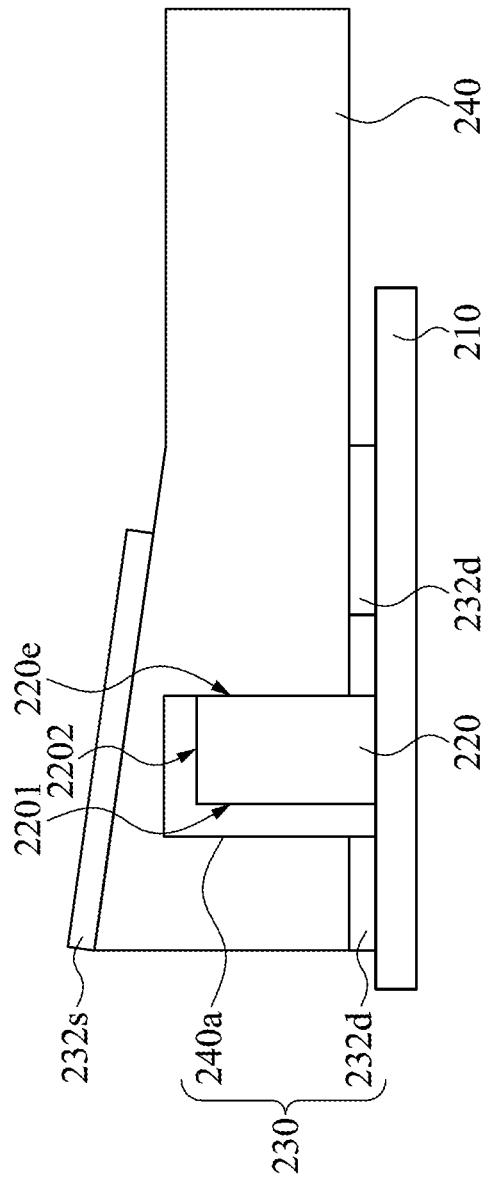

FIG. 12 is similar to FIG. 11, and the difference therebetween is that a top surface (not marked) of the light guide plate 240 of FIG. 12 is inclined. Specifically, the top surface of the light guide plate 240 extends obliquely upward from a side near the light emitting surface 220e to a side away from the light emitting surface 220e.

Figure 13:
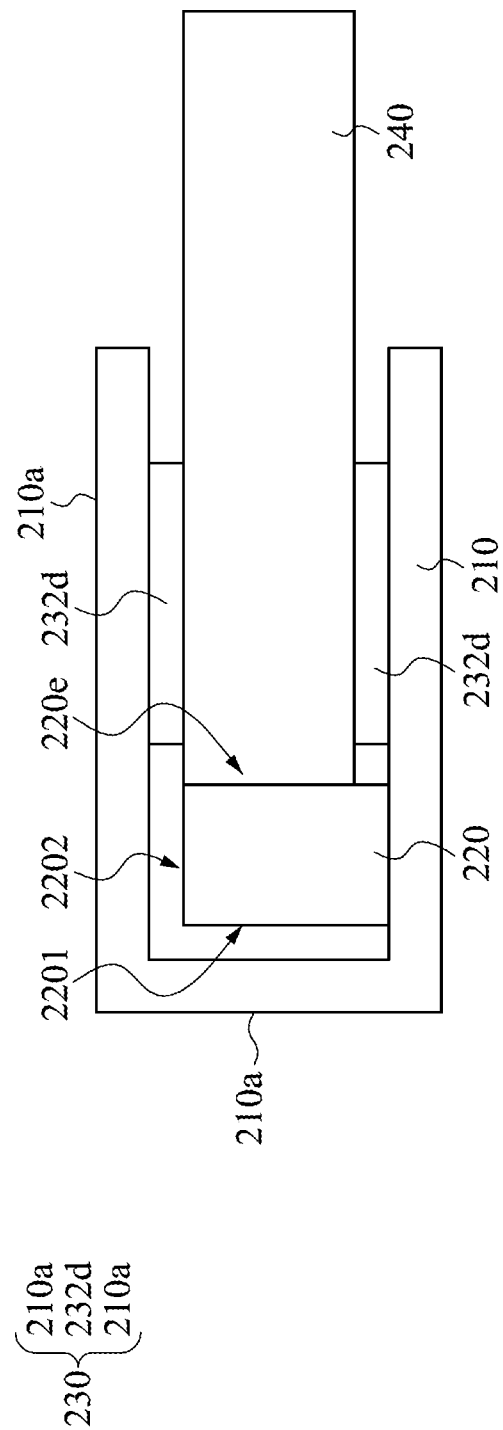

Referring to FIG. 13, the waterproof layer 230 includes a double-sided adhesive tape 232d and a portion 210a of a circuit board 210. As shown in FIG. 13, the circuit board 210 is folded into U-shape, and the portion 210a of circuit board 210 is L-shaped. The L-shaped portion 210a covers the first non-light emitting surface 2201 and the second non-light emitting surface 2202 of the light emitting diode 220. An end of the portion 210a is fixed on a light guide plate 240 through the double-sided adhesive tape 232d. In other embodiments, the extended portion 210a of the circuit board may be folded into any shape as long as it can cover the first non-light emitting surface 2201 and the second non-light emitting surface 2202 of the light emitting diode 220.

Figure 14:
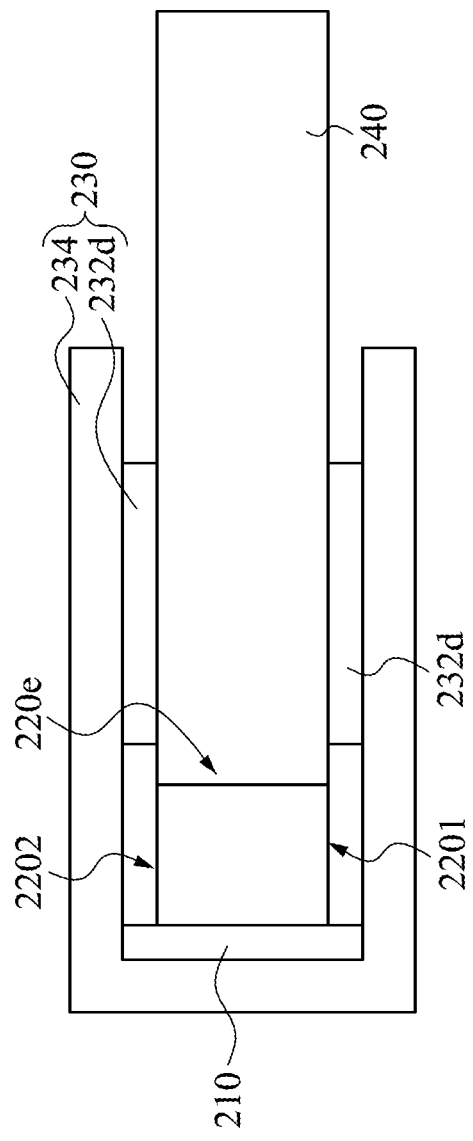

Referring to FIG. 14, the light emitting diode 220 is disposed over a circuit board 210, and the light emitting diode 220 is top-emitting. The light emitting diode 220 has light emitting surface 220e, a first non-light emitting surface 2201 and a second non-light emitting surface 2202. The first non-light emitting surface 2201 is opposite to the second non-light emitting surface 2202, and the light emitting surface 220e is connected between the first non-light emitting surface 2201 and the second non-light emitting surface 2202. The light emitting surface 220e may also be acted as a top surface. The light guide plate 240 is adjacent to the light emitting surface 220e of the light emitting diode 220.

As shown in FIG. 14, the waterproof layer 230 includes a double-sided adhesive tape 232d and a substrate 234. The substrate 234 is folded into U-shape. The substrate 234 covers not only the first non-light emitting surface 2201 and the second non-light emitting surface 2202 but also a bottom surface (not marked) of the circuit board 210. Two ends of the substrate 234 are respectively fixed on two sides (not marked) of the light guide plate 240. In other embodiments, the substrate 234 may be folded into any shape as long as it can cover the first non-light emitting surface 2201 and the second non-light emitting surface 2202 of the light emitting diode 220 and the circuit board 210.

As shown in FIGS. 5 to 14, the light emitting diode 220 is fully covered by the waterproof layer 230, and thus it can prevent the light emitting diode 220 from damage due to moisture.

Figure 15:
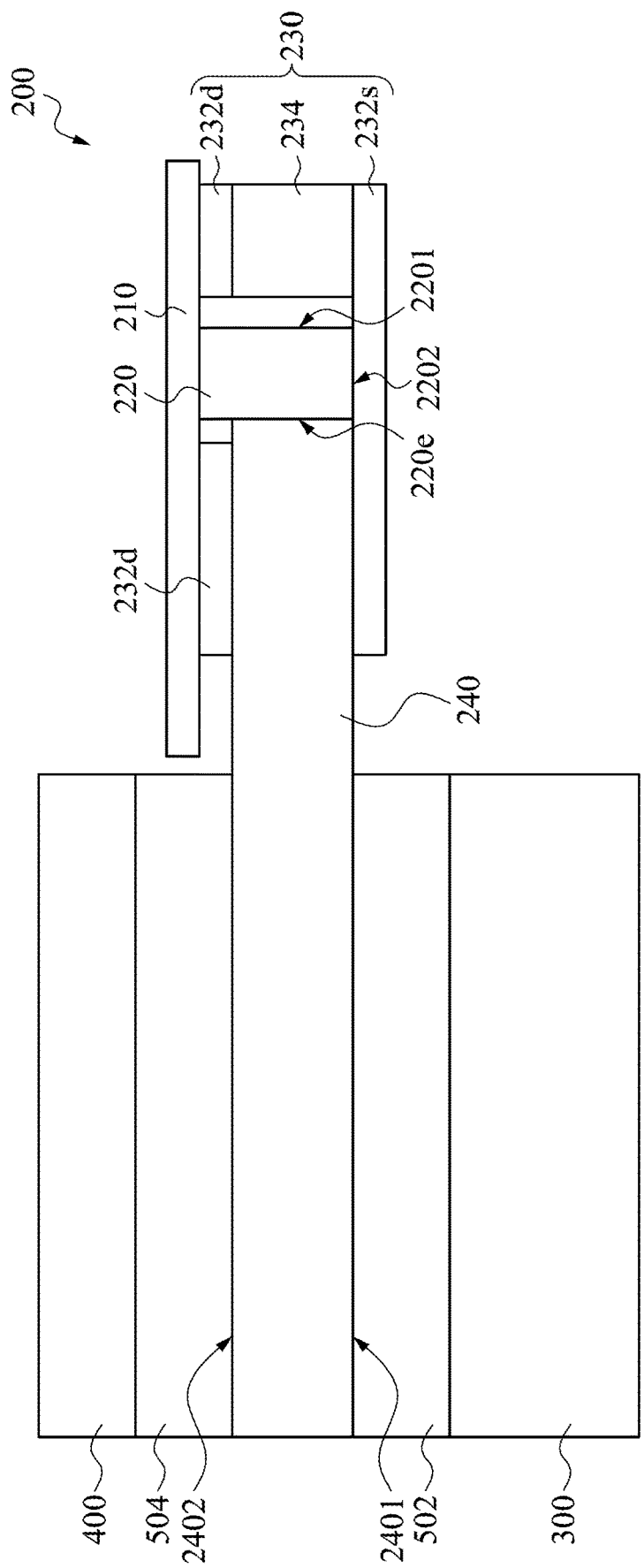
FIG. 15 is a cross-sectional view of a waterproof display device according to some embodiments of the present disclosure.

The present disclosure further provides a waterproof display device. FIG. 15 is a cross-sectional view of a waterproof display device according to some embodiments of the present disclosure. As shown in FIG. 15, the waterproof display device includes a waterproof light emitting module 200, a display panel 300 and a protective layer 400.

The waterproof light emitting module 200 may be the waterproof light emitting module 200 of FIGS. 5 to 14. The waterproof light emitting module 200 of FIG. 15 is the waterproof light emitting module of FIG. 6.

The display panel 300 is fixed on a first surface 2401 of a light guide plate 240. In some embodiments, the display panel 300 is a liquid crystal display panel, an organic light emitting display panel or an electrophoretic display panel. In some embodiments, the display panel 300 is fixed on the first surface 2401 of the light guide plate 240. In some embodiments, the adhesive layer 502 is an optically clear adhesive (OCA).

The protective layer 400 is fixed on a second surface 2402 of the light guide plate 240. The second surface 2402 is opposite to the first surface 2401. In some embodiments, the protective layer 400 is an anti-glare film (AG film) or a cover lens. In some embodiments, the protective layer 400 is fixed on the second surface 2402 of the light guide plate 240 through the adhesive layer 504. In some embodiments, the adhesive layer 504 is an optically clear adhesive.

As shown in FIG. 15, in the waterproof light emitting module 200, the waterproof layer 230 covers the light emitting diode 220, and thus can prevent the light emitting diode 220 from damage due to moisture.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A waterproof light emitting module, comprising:
  a circuit board;
  a light emitting diode on the circuit board, the light emitting diode having a light emitting surface, a first non-light emitting surface and a second non-light emitting surface;
  a light guide plate adjacent to the light emitting surface of the light emitting diode; and
  a waterproof layer covering the first non-light emitting surface and the second non-light emitting surface of the light emitting diode, the waterproof layer comprising an adhesive in contact with the circuit board and covering the first non-light emitting surface of the light emitting diode.

2. The waterproof light emitting module of claim 1, wherein the waterproof layer further comprises a substrate in contact with the adhesive and covers the second non-light emitting surface of the light emitting diode.

3. The waterproof light emitting module of claim 2, wherein the waterproof layer further comprises a double-sided adhesive tape, and the substrate is fixed on the light guide plate through the double-sided adhesive tape.

4. A waterproof display device, comprising:
the waterproof light emitting module of claim 1;
a display panel configured on a first surface of the light guide plate; and
a protective layer configured on a second surface of the light guide plate, and the second surface being opposite to the first surface.

5. A waterproof light emitting module, comprising:
a circuit board;
a light emitting diode on the circuit board, the light emitting diode having a light emitting surface, a first non-light emitting surface and a second non-light emitting surface;
a light guide plate adjacent to the light emitting surface of the light emitting diode; and
a waterproof layer covering the first non-light emitting surface and the second non-light emitting surface of the light emitting diode, wherein the waterproof layer comprises a single-sided adhesive tape, a double-sided adhesive tape and a substrate, and the substrate is fixed on the circuit board through the double-sided adhesive tape, and the substrate covers the first non-light emitting surface of the light emitting diode, and the single-sided adhesive tape is in contact with the substrate and covers the second non-light emitting surface of the light emitting diode.

6. The waterproof light emitting module of claim 5, wherein the substrate further covers the light emitting surface of the light emitting diode.

7. A waterproof light emitting module, comprising
a circuit board;
a light emitting diode on the circuit board, the light emitting diode having a light emitting surface, a first non-light emitting surface and a second non-light emitting surface;
a light guide plate adjacent to the light emitting surface of the light emitting diode; and
a waterproof layer covering the first non-light emitting surface and the second non-light emitting surface of the light emitting diode, wherein the waterproof layer comprises a double-sided adhesive tape and a substrate, and the substrate has a recessed portion covering the first non-light emitting surface and the second non-light emitting surface of the light emitting diode and further covering the light emitting surface, and the substrate is fixed on the circuit board through the double-sided adhesive tape.

8. A waterproof light emitting module, comprising
a circuit board;
a light emitting diode on the circuit board, the light emitting diode having a light emitting surface, a first non-light emitting surface and a second non-light emitting surface;
a light guide plate adjacent to the light emitting surface of the light emitting diode; and
a waterproof layer covering the first non-light emitting surface and the second non-light emitting surface of the light emitting diode, wherein the waterproof layer comprises a double-sided adhesive tape and a recessed portion of the light guide plate, and the recessed portion of the light guide plate covers the first non-light emitting surface and the second non-light emitting surface of the light emitting diode and further covers the light emitting surface, and the light guide plate is fixed on the circuit board through the double-sided adhesive tape.

9. A waterproof light emitting module, comprising:
a circuit board;
a light emitting diode on the circuit board, the light emitting diode having a light emitting surface, a first non-light emitting surface and a second non-light emitting surface;
a light guide plate adjacent to the light emitting surface of the light emitting diode; and
a waterproof layer covering the first non-light emitting surface and the second non-light emitting surface of the light emitting diode, wherein the waterproof layer comprises a double-sided adhesive tape and a portion of the circuit board, and the portion of the circuit board covers the first non-light emitting surface and the second non-light emitting surface of the light emitting diode, and the portion of the circuit board is fixed on the light guide plate through the double-sided adhesive tape.

\* \* \* \* \*